(12) United States Patent
Ito et al.

(10) Patent No.: US 10,196,095 B2
(45) Date of Patent: Feb. 5, 2019

(54) VEHICLE UNDERSTRUCTURE

(71) Applicant: TOYOTA JIDOSHA KABUSHIKI KAISHA, Toyota-shi, Aichi-ken (JP)

(72) Inventors: Eiji Ito, Nisshin (JP); Akihiko Ikeda, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/919,754

(22) Filed: Mar. 13, 2018

(65) Prior Publication Data

US 2018/0273115 A1 Sep. 27, 2018

(30) Foreign Application Priority Data

Mar. 22, 2017 (JP) .................. 2017-055458

(51) Int. Cl.
| | | |
|---|---|---|
| *B62D 25/20* | (2006.01) | |
| *B60R 13/08* | (2006.01) | |
| *B60K 5/12* | (2006.01) | |
| *B60K 17/16* | (2006.01) | |

(52) U.S. Cl.
CPC ........ *B62D 25/2072* (2013.01); *B60K 5/1233* (2013.01); *B60K 17/16* (2013.01); *B60R 13/0838* (2013.01); *B60R 13/0861* (2013.01); *B60R 2013/0807* (2013.01)

(58) Field of Classification Search
CPC .............. B62D 25/2072; B60K 5/1233; B60R 13/0838; B60R 13/0861; B60R 2013/0807; F16N 31/006

USPC ........................................... 180/69.1; 296/38
See application file for complete search history.

(56) References Cited

U.S. PATENT DOCUMENTS

| | | | | | |
|---|---|---|---|---|---|
| 2,902,103 | A | * | 9/1959 | Simmons | B62D 25/161 180/69.1 |
| 4,071,009 | A | * | 1/1978 | Kraina | B60R 13/0838 123/198 E |
| 4,275,617 | A | * | 6/1981 | Kalns | B60K 17/10 475/136 |
| 4,655,307 | A | * | 4/1987 | Lamoureux | B62D 25/2072 180/69.1 |
| 5,277,270 | A | * | 1/1994 | Hasegawa | B60G 9/04 180/291 |
| 5,915,495 | A | * | 6/1999 | Kerlin | B62D 21/183 180/291 |
| 5,992,926 | A | * | 11/1999 | Christofaro | B62D 21/02 296/204 |
| 2007/0228714 | A1 | * | 10/2007 | Bowers | B62J 23/00 280/770 |

(Continued)

FOREIGN PATENT DOCUMENTS

| | | |
|---|---|---|
| JP | S59-109467 A | 6/1984 |
| JP | 2001-030963 A | 2/2001 |

(Continued)

*Primary Examiner* — Frank B Vanaman
(74) *Attorney, Agent, or Firm* — Oliff PLC (57) ABSTRACT

A vehicle understructure includes a transaxle including a plurality of enclosures and a fastening part that mutually fastens outer edge parts of the enclosures, an undercover including an interference part that is made of resin, is displaced upward when a road surface interferes with the undercover, and faces the fastening part, and a metal plate that reinforces at least a portion of the interference part.

4 Claims, 6 Drawing Sheets

(56) References Cited

U.S. PATENT DOCUMENTS

| | | | |
|---|---|---|---|
| 2008/0018136 A1 | 1/2008 | Yamazaki | |
| 2012/0021301 A1 | 1/2012 | Ohashi | |
| 2015/0329153 A1* | 11/2015 | Oohashi | ................ B62D 35/02 296/180.1 |
| 2016/0318555 A1* | 11/2016 | Bjekovic | ................ B62D 25/20 |

FOREIGN PATENT DOCUMENTS

| | | |
|---|---|---|
| JP | 2006-306253 A | 11/2006 |
| JP | 2008-024047 A | 2/2008 |
| WO | 2014/033376 A1 | 3/2014 |

* cited by examiner

VEHICLE UNDERSTRUCTURE

INCORPORATION BY REFERENCE

The disclosure of Japanese Patent Application No. 2017-055458 filed on Mar. 22, 2017 including the specification, drawings and abstract is incorporated herein by reference in its entirety.

BACKGROUND

1. Technical Field

The present disclosure relates to a vehicle understructure. Particularly, the present disclosure relates to improvements in an undercover that covers a lower side of a transaxle.

2. Description of Related Art

In the related art, as disclosed in Japanese Unexamined Patent Application Publication No. 2008-24047 (JP 2008-24047 A), a vehicle understructure in which an undercover is disposed below an engine compartment is known. In the vehicle understructure as described above, in a case where a transaxle is disposed in the engine compartment, the undercover covers a lower side of the transaxle.

Meanwhile, vehicles with a low powertrain arrangement have been developed from the need for a low center of gravity in order to improve the motion performance of a vehicle. In the vehicles as described above, the minimum ground clearance of the transaxle is set to be low. Therefore, in a case where irregularities are present on a road surface, the road surface may interfere with an undercover (road surface interference).

JP 2008-24047 A discloses dealing with destructive input resulting from the road surface interference by alternately and continuously forming a recess and a protrusion in a front-rear direction of a vehicle on a lower surface of the undercover and by forming the sectional shape of an irregular part in a corrugated shape.

SUMMARY

However, in a case where the undercover is made of resin, there is a possibility that hole formation occurs in the undercover due to the road surface interference during vehicle traveling. Specifically, as the protrusion of the road surface abuts against the lower surface of the undercover to push up the undercover, there is a possibility that the undercover is caught between the lower surface of the transaxle and the road surface (the protrusion of the road surface), the undercover is damaged, and hole formation occurs.

In a case where the hole formation as described above occurs, the protrusion of the road surface directly interferes with the transaxle via the hole during vehicle traveling. Particularly, since the transaxle includes a plurality of enclosures and flange parts of the enclosures are fastened together by bolting, there is a possibility that the road surface directly interferes with the transaxle via the hole at a fastening part located at a lower part of the transaxle. In this case, in a case where a situation occurs in which a flange part is scraped due to the road surface interference (the flange part is scraped when the road surface rubs against the flange part) and the road surface interferes with a head part of a bolt of the fastening part, there is a possibility that a fastening force of the bolt decreases.

The disclosure provides a vehicle understructure that can suppress the problems caused by a road surface interfering with an undercover.

A first aspect of the disclosure relates to a vehicle understructure including a transaxle including a plurality of enclosures and a fastening part that mutually fastens outer edge parts of the plurality of enclosures, an undercover including an interference part that is made of resin, is displaced upward when a road surface interferes with the undercover, and faces the fastening part and a metal plate that reinforces at least a portion of the interference part.

By virtue of the specific matter, the interference part, which is a portion of the undercover and that faces the fastening part (a fastening part that interferes with the undercover that is displaced upward when the road surface interferes with the undercover) of the transaxle, is reinforced by the metal plate. Therefore, hole formation of the undercover when the road surface interferes with the undercover (hole formation resulting from the undercover being caught between the fastening part of the transaxle and the road surface) is suppressed. Otherwise, even when hole formation occurs in the undercover, the metal plate restrains the road surface from directly interfering with the fastening part (restrains the road surface from rubbing against the fastening part). For this reason, there is no case where the fastening part is scraped due to direct interference of the road surface with the fastening part of the transaxle (there is no case where the fastening part is scraped as the road surface rubs against the fastening part). As a result, a fastening force in the fastening part can be kept high.

The vehicle understructure according to the aspect of the disclosure may further include a shock absorbing material or sound absorbing material provided between the metal plate and the transaxle. The metal plate may be attached to an upper surface of the undercover.

According to the above description, even in a case where the undercover is displaced upward due to a road surface interference, the sound absorbing material or shock absorbing material is interposed between the transaxle and the metal plate. That is, according to the above, the transaxle and the metal plate do not come into direct contact with each other, and generation of abnormal noise resulting from the contact between metals can be suppressed.

The vehicle understructure according to the aspect of the disclosure may further include a mount member that elastically supports the transaxle on a vehicle body. The fastening part may be located on the lowest side when the transaxle rocks downward about a supporting position of the mount member.

During vehicle traveling, the fastening part located on the lowest side when the transaxle rocks downward about the supporting position of the mount member, and the undercover approach each other. At the time of a road surface interference, a possibility that the undercover is caught between the fastening part and the road surface and hole formation occurs in the undercover is high. In the aspect of the disclosure, the interference part of the undercover with a high possibility that the hole formation occurs is reinforced by the metal plate. Therefore, even when the undercover is caught, the hole formation of the undercover is suppressed, or even when the hole formation occurs in the undercover, the metal plate restrains the road surface from directly interfering with the fastening part. For this reason, there is no case where the fastening part is scraped due to direct interference of the road surface with the fastening part of the transaxle. As a result, a fastening force in the fastening part can be kept high.

In the vehicle understructure according to the aspect of the disclosure, the enclosures may include a housing located on an internal combustion engine side, and a case body located on the opposite side of the housing from an internal combustion engine, the outer edge parts may include a first flange located on the internal combustion engine side of the housing, a second flange located on a case body side of the housing, and a third flange formed at the case body, the second flange and the third flange may be overlapped with each other and fastened together, a lower end of the second flange may be located nearer to a lower side of a vehicle than a lower end of the first flange, and the fastening part fastens the second flange and the third flange together.

The lower end of the second flange of the housing located on the case body side is located nearer to the lower side than the lower end of the first flange of the housing located on the internal combustion engine side. Accordingly, a work space in the fastening work between the housing and the case body is secured on the housing side (nearer to the housing than the case body). That is, fastening work (bolt fastening work or the like) using a tool is performed toward the case body from the housing side. In a case where the lower end of the second flange of the housing located on the case body side is located nearer to the lower side than the lower end of the first flange of the housing located on the internal combustion engine side in consideration of workability as described above, at the time of a road surface interference, there is a high possibility that the undercover is caught in the road surface and the fastening part on the lower side of the fastening part between the second flange of the housing located on the case body side and the third flange of the case body, and hole formation occurs in the undercover. In the aspect of the disclosure, the interference part of the undercover, with a high possibility that the hole formation occurs, is reinforced by the metal plate. Therefore, even when the undercover is caught, the hole formation of the undercover is suppressed, or even when the hole formation occurs in the undercover, the metal plate restrains the road surface from directly interfering with the fastening part. For this reason, there is no case where the fastening part is scraped due to direct interference of the road surface with the fastening part of the transaxle. As a result, a fastening force in the fastening part can be kept high.

In the aspect of the disclosure, in the undercover, a portion including the interference part that faces the fastening part (the fastening part that interferes with the undercover displaced upward when the road surface interferes with the undercover) of the transaxle is partially reinforced by the metal plate. For this reason, hole formation of the undercover when the road surface interferes with the undercover is suppressed. Otherwise, even when hole formation occurs in the undercover, the metal plate restrains the road surface from directly interfering with the fastening part. Therefore, there is no case where the fastening part is scraped due to direct interference of the road surface with the fastening part of the transaxle. As a result, a fastening force in the fastening part can be kept high.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings. In the present embodiment, a case where the disclosure is applied to an FF (front-engine front-drive) type hybrid vehicle will be described.

Figure 1:
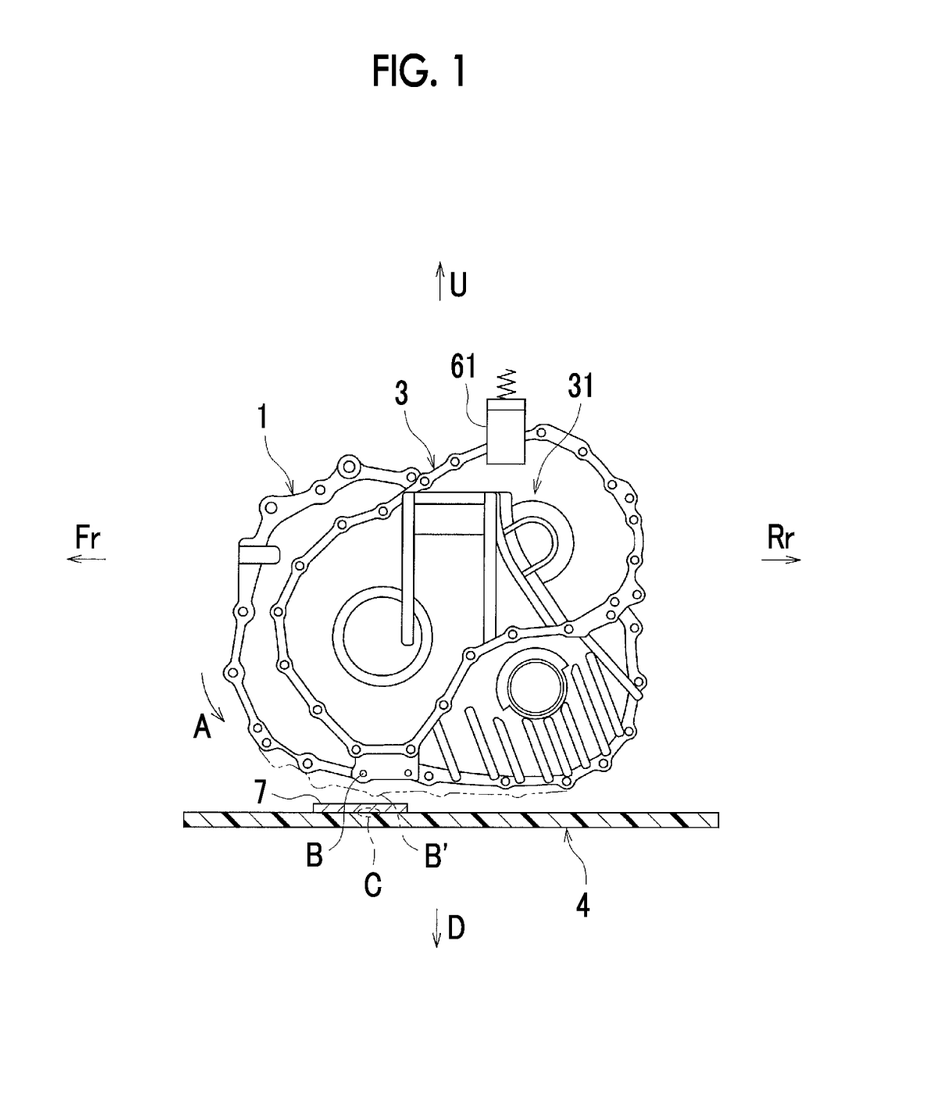
FIG. 1 is a side view illustrating an arrangement layout of a powertrain unit and an undercover in a first embodiment.
Figure 2:
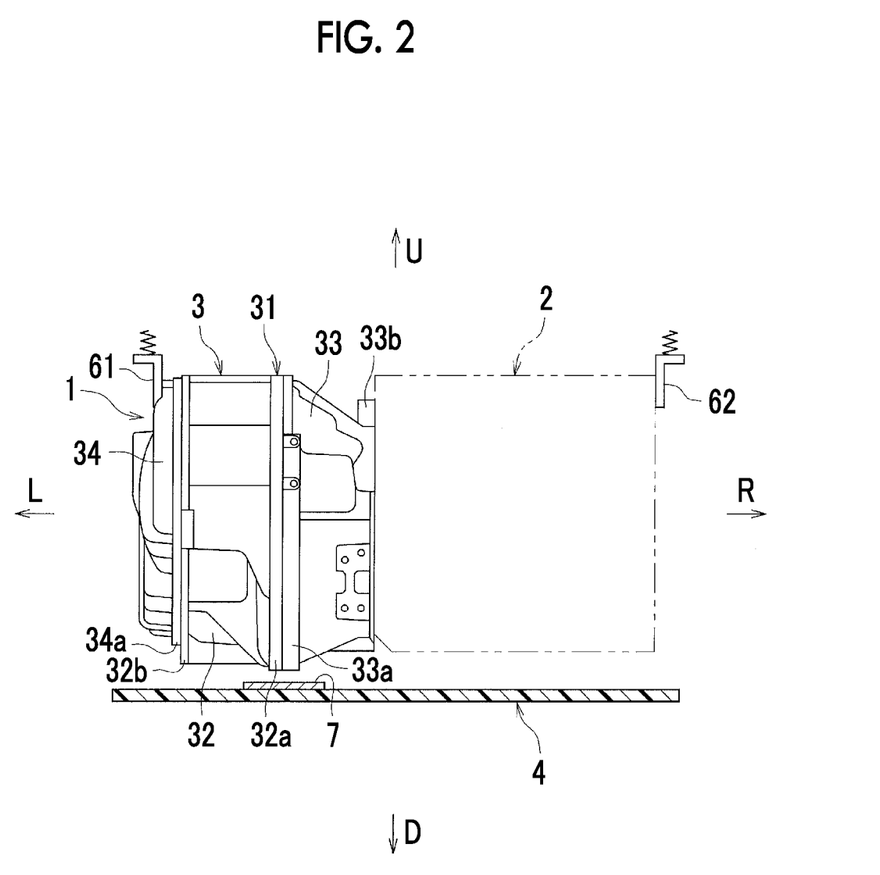
FIG. 2 is a back view illustrating the arrangement layout of the powertrain unit and the undercover in the first embodiment.
Figure 3:
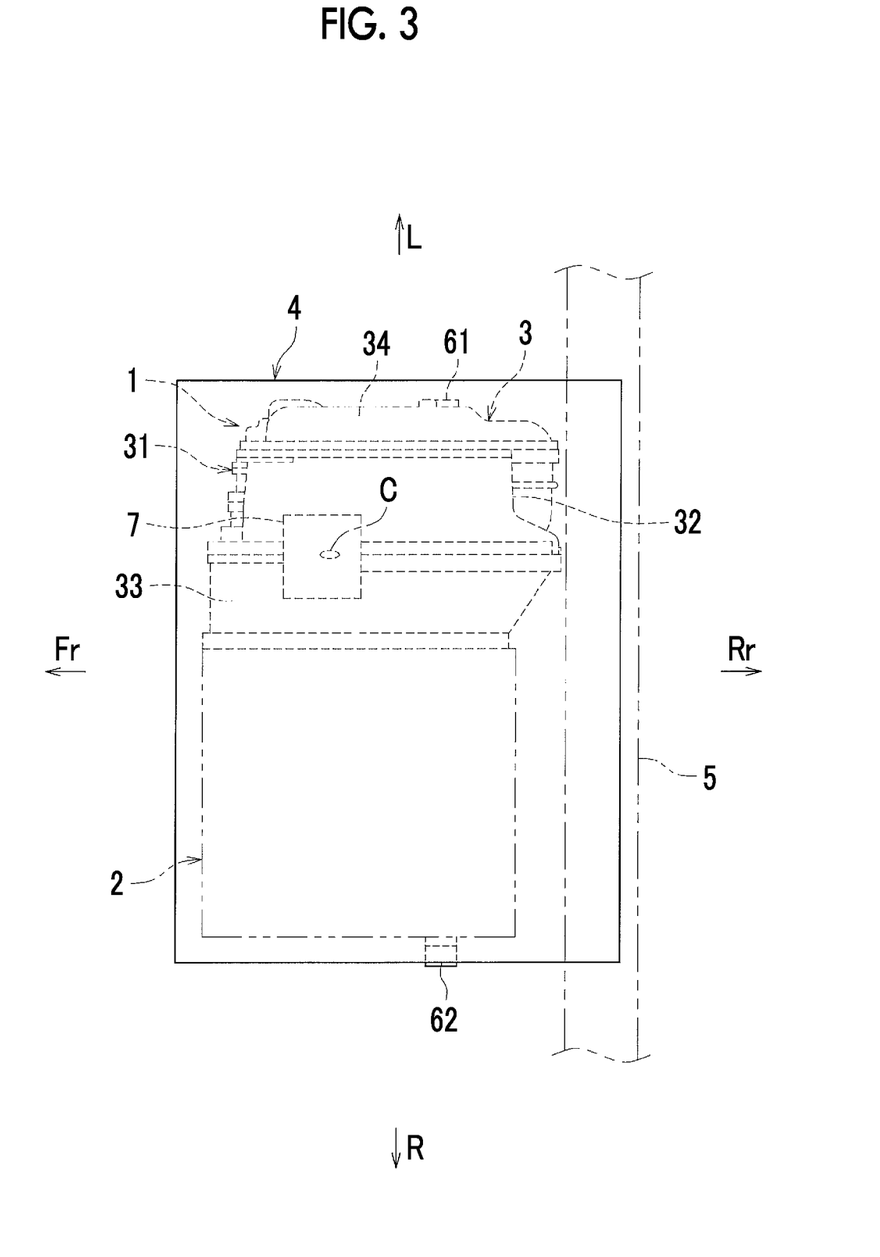
FIG. 3 is a bottom view illustrating the arrangement layout of the powertrain unit and the undercover in the first embodiment.

First Embodiment
Schematic Structure of Powertrain Unit
FIG. 1 is a side view illustrating an arrangement layout of a powertrain unit 1 and an undercover 4 related to the present embodiment. FIG. 2 is a back view (a view viewed from the rear of a vehicle) illustrating the arrangement layout of the powertrain unit 1 and the undercover 4. FIG. 3 is a bottom view illustrating the arrangement layout of the powertrain unit 1 and the undercover 4. In FIGS. 1 to 3, arrow Fr indicates the front of the vehicle, arrow Rr indicates the rear of the vehicle, arrow U indicates upward, arrow D indicates downward, arrow R indicates the right side of the vehicle, and arrow L indicates the left side of the vehicle.

As illustrated in FIGS. 1 to 3, the powertrain unit 1 has a structure into which an engine 2 (refer to an imaginary line of FIG. 2), a transaxle 3, and the like are integrally incorporated.

In the transaxle 3, a damper, a planetary gear, a power generating motor, a traveling drive motor, a differential device, and the like that are not illustrated are accommodated within a transaxle case 31. The transaxle case 31 has a structure into which a transaxle case body 32, a transaxle housing 33 coupled to a first side (a side where the engine 2 is disposed) of the transaxle case body 32, a cover 34 coupled to a second side (a side opposite to the side where the engine 2 is disposed) of the transaxle case body 32 are integrally incorporated. Specifically, attachment flange parts 32a, 32b are respectively provided on the first side and the second side of the transaxle case body 32. The attachment flange part 32a provided on the first side of the transaxle case body 32 is fastened (coupled) to an attachment flange part 33a provided at the transaxle housing 33 by bolting. The attachment flange part 32b provided on the second side of the transaxle case body 32 is fastened to an attachment flange part 34a provided at the cover 34 by bolting. An attachment flange part 33b is also provided on the side of the transaxle housing 33 where the engine 2 is disposed, and the attachment flange part 33b is fastened to the engine 2 by bolting. As the engine 2, for example, a four-cylinder gasoline engine is adopted.

As described above, the engine 2 and the transaxle 3 are integrally incorporated to constitute the powertrain unit 1, and the drive power of the engine 2 output from a crankshaft (not illustrated) of the engine 2 is input to the planetary gear via the damper. The drive power of the engine 2 input to the planetary gear is split by the planetary gear and is transmitted to the power generating motor and the differential device. The transaxle case body 32, the transaxle housing 33, and the cover 34 in the transaxle 3 configured as described above is equivalent to enclosures of a transaxle as referred to in the disclosure. The respective attachment flange parts 32a, 32b, 33a, 33b, 34a of the transaxle case body 32, the transaxle housing 33, and the cover 34 are equivalent to outer edge parts of the enclosures of the transaxle referred to in the disclosure.

The positions of lower ends of the attachment flange part 32a of the transaxle case body 32 and the attachment flange part (the attachment flange part fastened to the transaxle case body 32) 33a of the transaxle housing 33 are set at positions lower than the position of a lower end of the attachment flange part (the attachment flange part fastened to the engine 2) 33b of the transaxle housing 33. This is because, in the fastening work between the attachment flange part 32a of the transaxle case body 32 and the attachment flange part 33a of the transaxle housing 33, a work space is secured on the transaxle housing 33 side (nearer to the transaxle housing 33 than the transaxle case body 32), and fastening work (bolt fastening work or the like) using a tool is easily performed toward the transaxle case body 32 from the transaxle housing 33 side.

The powertrain unit 1 is elastically supported on a vehicle body (a vehicle body member and the like) (not illustrated) by a plurality of mount members 61, 62. For this reason, the powertrain unit 1 is rockable about supporting positions of the mount members 61, 62 during vehicle traveling. The imaginary line in FIG. 1 illustrates a posture in a case where the powertrain unit 1 rocks downward about the supporting positions of the mount members 61, 62 (rocks such that a vehicle front side is displaced downward; refer to arrow A in FIG. 1).

As illustrated by an imaginary line in FIG. 3, a suspension cross member 5 is disposed on the lower side of a vehicle rear part (the lower side of the undercover 4 to be described below) in the powertrain unit 1. The suspension cross member 5 is a vehicle body structure member for supporting a suspension device for front wheels (not illustrated), is made of a rectangular closed sectional structure, and has high rigidity.

Structure of Undercover

The undercover 4 that is a member characterized in the present embodiment will be described. As illustrated in FIGS. 1 to 3, the undercover 4 is a member that is made of a non-woven fabric of synthetic resin and covers a lower side of the powertrain unit 1. That is, an outer edge of the undercover 4 has a slightly larger shape than a lower surface shape of the engine 2, and a lower surface shape of the transaxle 3 so as to cover the entire lower sides of the engine 2 and the transaxle 3. The undercover 4 is attached to a lower part of the powertrain unit 1 by bolting or other means. The member to which the undercover 4 is attached is not particularly limited.

As a feature of the undercover 4, a metal plate (steel plate) 7 may be attached to a portion of an upper surface of the undercover 4 to reinforce the undercover.

The metal plate 7 has a substantially square shape, and is integrally attached to the upper surface of the undercover 4 by a resin clip (not illustrated). Means for attaching the metal plate 7 to the undercover 4 may be riveting, bolting, bonding, or the like. As specific dimensions of the metal plate 7, a square shape having one side of 100 mm is adopted, and the thickness dimension of the plate is 1 mm. The aforementioned value is not limited to this and is appropriately set.

The attachment positions of the metal plate 7 on the upper surface of the undercover 4 are portions of the undercover 4 including a part (hereinafter, a part of the undercover 4 is referred to as an interference part; an interference part to which reference sign C is given in FIGS. 1 and 3) facing fastening parts which interfere with the undercover 4 displaced upward (pushed upward) when a road surface interferes with the undercover 4 (hereinafter referred to as a fastening part; a fastening part to which reference sign B, B☐ is given in FIG. 1), among fastening parts that fasten the attachment flange part 32a of the transaxle case body 32 and the attachment flange part 33a of the transaxle housing 33 together.

More specifically, in the transaxle 3, the fastening part B, B' among the fastening parts, which fasten the attachment flange part 32a of the transaxle case body 32 and the attachment flange part 33a of the transaxle housing 33 together, is displaced in position in a vehicle front-rear direction in a case where the transaxle 3 rocks downward about the supporting positions of the mount members 61, 62 and in a case where the transaxle 3 does not rock. That is, in a posture (a posture illustrated by an imaginary line in FIG. 1) in which the transaxle 3 rocks downward (refer to arrow A in FIG. 1), a fastening part is at a position illustrated by B' in this drawings. The position (the fastening part at the position of B' in the drawing) of the fastening part B' is the lowest side in the transaxle 3 when the transaxle 3 rocks downward about the supporting positions of the mount members 61, 62. That is, in this state, the fastening part B' is a fastening part closest to the undercover 4. In contrast, in a posture (a posture illustrated by a solid line in FIG. 1) in which transaxle 3 does not rock downward, the fastening part is at a position illustrated by B in the drawing. As described above, the fastening part B, B' is displaced in position in a vehicle front-rear direction in a case where the transaxle 3 rocks downward about the supporting positions of the mount members 61, 62 and in a case where the transaxle 3 does not rock.

Then, when the undercover 4 is displaced upward due to a road surface interference (is displaced to such a degree that the undercover 4 interferes with the lower surface of the transaxle 3), the undercover 4 interferes with the fastening part at the position of B' of FIG. 1 in a case where the transaxle 3 rocks downward. That is, in the undercover 4, a region vertically below the position of the fastening part B' interferes with the fastening part B'. On the other hand, in a case where transaxle 3 does not rock downward, the undercover 4 interferes with the fastening part at the position of B of FIG. 1. That is, in the undercover 4, a region vertically below the position of the fastening part B interferes with the fastening part B.

For this reason, the region of the undercover 4 that faces the lower surface of the transaxle 3 ranging from the position of B' of the fastening part to the position of B is defined as an interference part C (refer to a region surrounded by one-dot chain line in FIG. 1).

Then, the metal plate 7 is attached to the upper surface of the undercover 4 including the interference part C. For this reason, even in any of a case where the transaxle 3 rocks downward about the supporting positions of the mount members 61, 62 and a case where the transaxle 3 does not rock, when the undercover 4 is displaced upward due to a road surface interference (is displaced to such a degree that the undercover 4 interferes with the lower surface of the transaxle 3), a resin portion of the undercover 4 does not interfere with the fastening part B, B', and the metal plate 7 interferes with the fastening part B, B' of the transaxle 3.

The dimensions (in the present embodiment, one side is 100 mm) of the metal plate 7 are set by taking into consideration a distance from the position of B' to the position of B, which is a range of the displacement of the fastening part B, B' in the vehicle front-rear direction, an arrangement error of the transaxle 3, an error of the attachment position (the attachment position of the undercover 4 to the powertrain unit 1) of the undercover 4, and the like.

The structure "a portion including the interference part where the undercover faces the fastening part of the transaxle is partially reinforced by the metal plate" referred to in the disclosure is realized as described above.

The lowest end portion of the transaxle 3 in a case where the transaxle 3 does not rock downward is present nearer to the vehicle rear side than the fastening part B. However, in a situation where a protrusion of a road surface reaches the lowest end portion, the protrusion of the road surface interferes with a lower surface of the suspension cross member 5. In this case, the suspension cross member 5 is pushed upward. As a result, the powertrain unit 1 is also pushed upward, the lowest end portion of the transaxle 3 moves upward, and the interference of the protrusion of the road surface with the undercover 4 is avoided. For this reason, the interference part C in the undercover 4 is a part with a high possibility that the interference part C is caught between the protrusion of the road surface and the fastening part B, B' at the time of a road surface interference.

During Vehicle Traveling

The vehicle traveling will be described. During vehicle traveling, as the protrusion of the road surface abuts against the lower surface of the undercover 4 to push the undercover 4 up, there is a case where the undercover 4 is caught between the lower surface of the transaxle 3 and the road surface (the protrusion of the road surface). The part to be caught in this case is the interference part C as described above. That is, the interference part C is caught between the protrusion of the road surface and the fastening part B, B' (the fastening part at the position of B' of FIG. 1 in a case where the transaxle 3 rocks downward and the fastening part at the position of B of FIG. 1 in a case where the transaxle 3 does not rock downward).

Then, the metal plate 7 is attached to the upper surface of the undercover 4 including the interference part C, and thereby the undercover 4 is reinforced. For this reason, hole formation of the undercover 4 when the road surface interferes with the undercover 4 (hole formation resulting from the undercover 4 being caught between the fastening part B, B' of the transaxle 3 and the road surface) is suppressed. Otherwise, even when hole formation occurs in the undercover 4, the metal plate 7 restrains the road surface from directly interfering with the fastening part B, B' (restrains the road surface from rubbing against the fastening part B, B'). For this reason, there is no case where the fastening part B, B' is scraped due to direct interference of the road surface with the fastening part B, B' of the transaxle 3 (there is no case where the fastening part B, B' is scraped as the road surface rubs against the fastening part B, B'). As a result, a fastening force in the fastening part B, B' can be kept high.

Second Embodiment

A second embodiment will be described. Here, solely differences from the first embodiment will be described.

Figure 4:
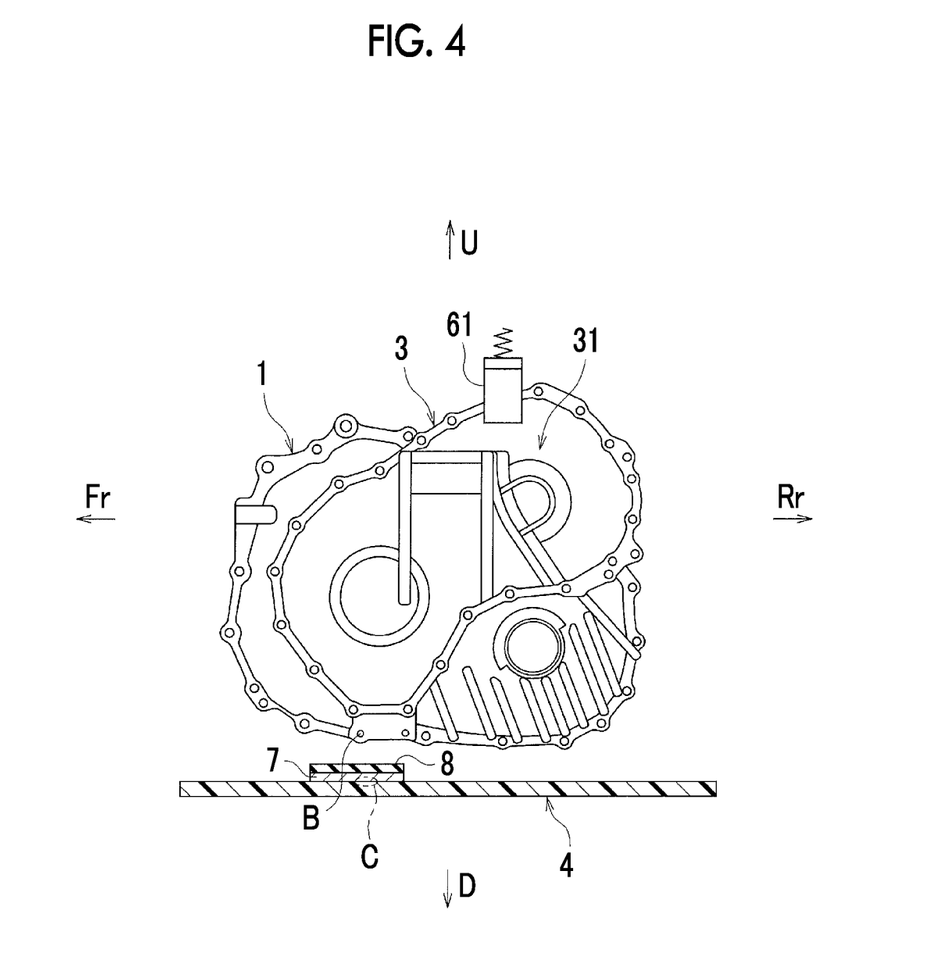
FIG. 4 is a side view illustrating an arrangement layout of the powertrain unit and the undercover in a second embodiment.

FIG. 4 is a side view illustrating an arrangement layout of the powertrain unit 1 and the undercover 4 in the present embodiment. As illustrated in FIG. 4, the undercover 4 in the present embodiment has a structure in which a shock absorbing material 8 made of rubber is further attached to an upper surface of the metal plate 7 attached to the upper surface of the undercover 4. The shape of the shock absorbing material 8 (the shape thereof in a plan view) is the same square shape as that of the metal plate 7. As means for attaching the shock absorbing material 8 to the upper surface of the metal plate 7, a resin clip, riveting, bolting, bonding, or the like is applicable.

The shape of the shock absorbing material 8 is not limited to the aforementioned shape, and is appropriately set. For example, the shape of the shock absorbing material 8 in a plan view may be made larger the shape of the metal plate 7 in the plan view, an upper side of the metal plate 7 may be covered with the shock absorbing material 8, and an outer edge part of the shock absorbing material 8 may be attached to the upper surface of the undercover 4.

According to the structure of the present embodiment, in addition to the effects of the first embodiment, even in a case where the undercover 4 is displaced upward due to a road surface interference, the metal plate 7 and the lower surface of the transaxle 3 do not come into direct contact with each other, and generation of abnormal noise resulting from the contact between metals can be suppressed.

Third Embodiment

A third embodiment will be described. Here, solely differences from the first embodiment will also be described.

Figure 5:
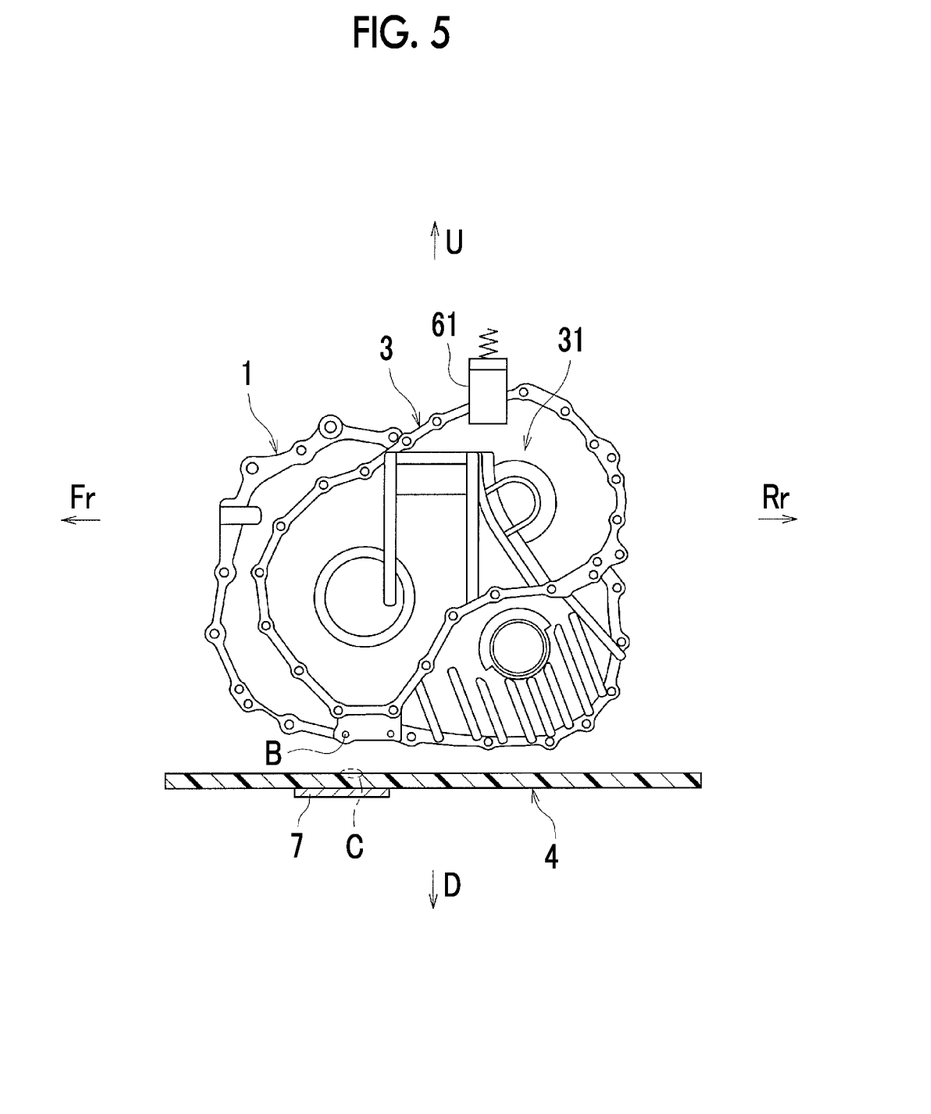
FIG. 5 is a side view illustrating an arrangement layout of the powertrain unit and the undercover in a third embodiment.

FIG. 5 is a side view illustrating an arrangement layout of the powertrain unit 1 and the undercover 4 in the present embodiment. As illustrated in FIG. 5, in the undercover 4 in the present embodiment, the metal plate 7 is attached to a portion of the lower surface of the undercover 4 and is reinforced. The position where the metal plate 7 is attached is the lower surface of the undercover 4 corresponding to the interference part C that faces the fastening part B of the transaxle 3.

According to the structure of the present embodiment, the same effects as those in the case of the first embodiment can also be obtained. In the present embodiment, a situation in which the road surface and the interference part C of the undercover 4 come into direct contact with each other can be suppressed with the metal plate 7. Therefore, the effect of restraining the hole formation of the undercover 4 can be enhanced.

In the structure in which the metal plate 7 is attached to a portion of the lower surface of the undercover 4 as in the present embodiment, the same shock absorbing material as that of the second embodiment may be attached to the lower surface of the metal plate 7. According to the above, the metal plate 7 and the road surface do not come into direct contact with each other, and generation of abnormal noise resulting from the contact between both the metal plate 7 and the road surface can be suppressed. The shock absorbing material may be attached to the upper surface of the undercover 4.

Fourth Embodiment

A fourth embodiment will be described. Here, solely differences from the first embodiment will also be described.

Figure 6:
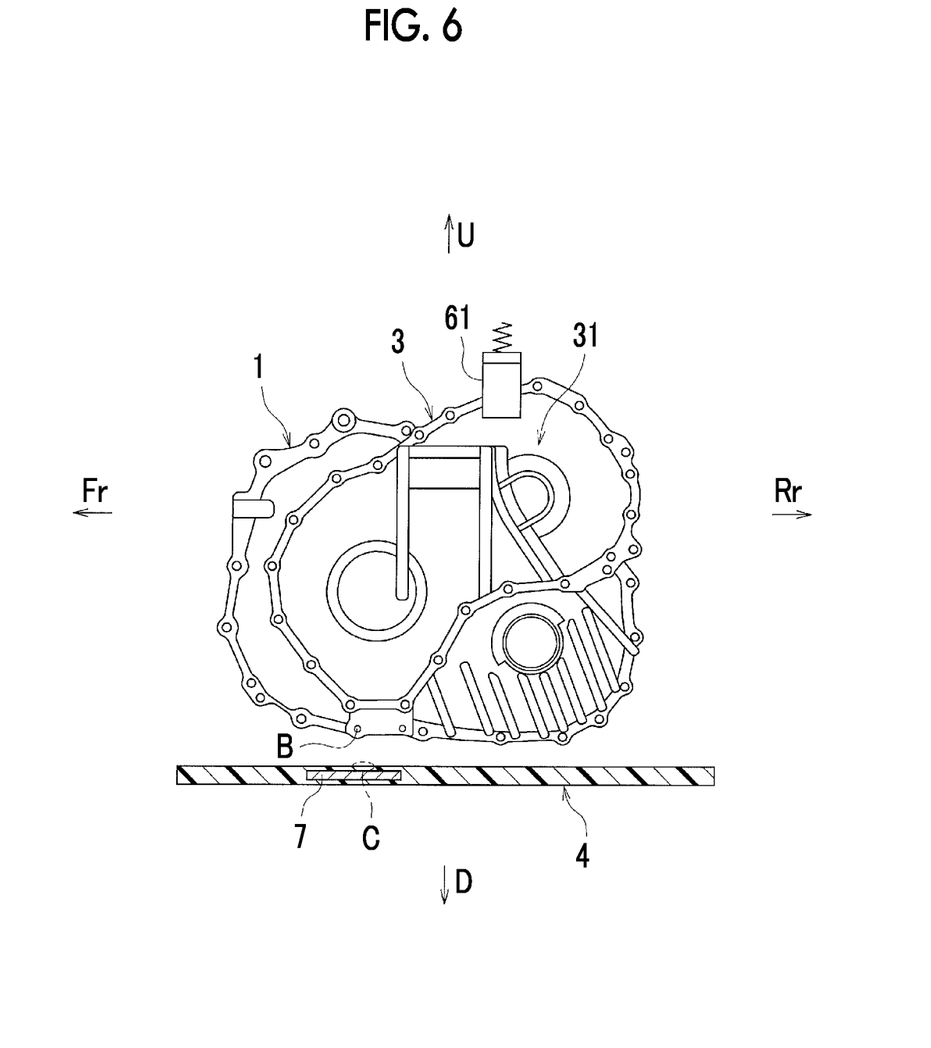
FIG. 6 is a side view illustrating an arrangement layout of the powertrain unit and the undercover in a fourth embodiment.

FIG. 6 is a side view illustrating an arrangement layout of the powertrain unit 1 and the undercover 4 in the present embodiment. As illustrated in FIG. 6, in the undercover 4 in the present embodiment, the metal plate 7 is embedded and reinforced in the undercover 4. The position where the metal plate 7 is embedded is a position corresponding to the interference part C. In the present embodiment, the metal plate 7 is integrally molded during the molding of the undercover 4.

According to the structure of the present embodiment, in addition to the effects of the first embodiment, even in a case where the undercover 4 is displaced upward due to a road surface interference, the metal plate 7 and the lower surface of the transaxle 3 do not come into direct contact with each other. Therefore, generation of abnormal noise resulting from the contact between metals can be suppressed.

In the present embodiment, the same shock absorbing material as that of the second embodiment may also be attached to the upper surface or lower surface of the undercover 4.

Other Embodiments

The disclosure is not limited to solely the above respective embodiments, and all modifications and applications that are covered by the scope of the claims and equivalents to the claims are possible.

For example, in the above respective embodiments, the metal plate 7 is a square plate material. The disclosure is not limited to this, and plate materials having other shapes, such as an oblong shape and a circular shape, may be adopted.

In the respective embodiments, a case where the disclosure is applied to the vehicle on which the engine 2 is mounted has been described. The disclosure is not limited to this, and can also be applied to vehicles on which other internal combustion engines, such a diesel engine, are mounted. The number of cylinders and the types (a V type, a horizontally opposed type, and the like) of engines are not particularly limited.

In the above respective embodiments, a case where the disclosure is applied to a hybrid vehicle (a vehicle on which an engine and an electric motor are mounted as drive power sources) has been described. However, the disclosure can also be applied to a related-art vehicle (a vehicle on which solely an engine is mounted as a drive power source).

In the above respective embodiments, the fastening part B, B' of the transaxle 3 is provided at one position, and correspondingly, the interference part C in the undercover 4 is also provided at one position. The disclosure is not limited to this, two or more fastening parts of the transaxle 3 may be provided, and correspondingly, two or more interference sites in the undercover 4 may also be specified. In this case, a plurality of metal plates is applied in correspondence with each interference site. A large-sized metal plate may be applied such that the interference sites can be reinforced by the one metal plate.

The shock absorbing material 8 is not limited to one made of rubber. Instead of the shock absorbing material 8, a sound absorbing material (sponge, glass wool, or the like) may be applied. The shock absorbing material 8 and the sound absorbing material may be attached to the lower surface (the lower surface including the fastening part B, B') of the transaxle 3.

The material of the metal plate 7 is not particularly limited, and may be a material capable of withstanding any interference with a road surface and the transaxle 3.

The disclosure can be applied to the undercover that covers the lower side of the transaxle.

What is claimed is:

1. A vehicle understructure comprising:
a transaxle including a plurality of enclosures and a fastening part mutually fastening outer edge parts of the plurality of enclosures, the plurality of enclosures including a housing located on an internal combustion engine side of the transaxle, and a case body located on a case body side of the transaxle opposite to an internal combustion engine, the outer edge parts of the plurality of enclosures include a first flange disposed on an internal combustion engine side of the housing, a second flange disposed on a case body side of the housing, and a third flange formed on the case body, the second flange and the third flange being overlapped with each other and fastened together by the fastening part, the second flange having a lower end that is located nearer to a lower side of a vehicle than a lower end of the first flange when the transaxle is mounted on the vehicle;
an undercover including an interference part made of resin, the undercover configured to be displaced upward upon interference with a road surface, the undercover facing the fastening part; and
a metal plate reinforcing at least a portion of the interference part.

2. The vehicle understructure according to claim 1, further comprising a shock absorbing material provided between the metal plate and the transaxle, wherein the metal plate is attached to an upper surface of the undercover.

3. The vehicle understructure according to claim 1, further comprising a mount member elastically supporting the transaxle on a vehicle body, wherein the fastening part is at a lowest position with respect to the vehicle body when the transaxle rocks downward about a supporting position of the mount member.

4. The vehicle understructure according to claim 1, further comprising a sound absorbing material provided between the metal plate and the transaxle, wherein the metal plate is attached to an upper surface of the undercover.

* * * * *